(12) United States Patent
Yang et al.

(10) Patent No.: US 10,555,377 B2
(45) Date of Patent: Feb. 4, 2020

(54) WARMER WITH INTEGRATED HEATING MODULE

(71) Applicant: Shenzhen Chenbei Technology Co., Ltd., Shenzhen, OT (CN)

(72) Inventors: Lin Yang, Shenzhen (CN); Hai Yang, Shenzhen (CN)

(*) Notice: Subject to any disclaimer, the term of this patent is extended or adjusted under 35 U.S.C. 154(b) by 0 days.

(21) Appl. No.: 15/826,422

(22) Filed: Nov. 29, 2017

(65) Prior Publication Data
US 2019/0166655 A1 May 30, 2019

(51) Int. Cl.
*H05B 1/02* (2006.01)
*H05B 3/16* (2006.01)
*H05B 3/68* (2006.01)
*B82Y 30/00* (2011.01)
*H05B 3/12* (2006.01)

(52) U.S. Cl.
CPC .............. *H05B 3/16* (2013.01); *H05B 3/68* (2013.01); *B82Y 30/00* (2013.01); *H05B 3/12* (2013.01)

(58) Field of Classification Search
CPC ... H05B 3/16; H05B 3/12; H05B 3/36; H05B 1/02; H05B 1/0256; H05B 1/0266; H05B 3/0076; H05B 2213/04; H05B 2113/05; B82Y 30/00
USPC ............. 219/536, 445.1, 443.1, 448.12, 481, 219/446.1, 541
See application file for complete search history.

(56) References Cited

U.S. PATENT DOCUMENTS

| | | | | |
|---|---|---|---|---|
| 4,558,206 A * | 12/1985 | Ball | ................. | E21B 36/00 137/341 |
| 5,413,032 A * | 5/1995 | Bruno | ................. | A47J 37/0676 219/436 |
| 6,867,394 B2 * | 3/2005 | Li | ................. | A47J 27/004 219/386 |
| 10,092,129 B2 * | 10/2018 | Jenkins | ................. | A47J 27/62 |
| 10,226,146 B1 * | 3/2019 | Zeder | ................. | A47J 27/004 |
| 2015/0061345 A1 * | 3/2015 | Van Der Linden | .... | H05K 1/028 297/452.1 |
| 2016/0051089 A1 * | 2/2016 | Ahmed | ................. | A47J 37/0709 126/25 R |
| 2017/0238368 A1 * | 8/2017 | Shangin | ................. | B82Y 30/00 219/553 |
| 2018/0077755 A1 * | 3/2018 | Kim | ................. | H05B 3/262 |

* cited by examiner

*Primary Examiner* — Mark H Paschall
(74) *Attorney, Agent, or Firm* — Tsz Lung Yeung

(57) ABSTRACT

A warmer includes a main housing, a heating assembly and a control module. The main housing has a receiving cavity. The heating assembly includes a top heating plate and am integrated heating module. The integrated heating module includes a heating element and an insulating member assembled to form an integrated structure. The insulating member is connected to a bottom side of the heating element for preventing excessive heat from reaching the receiving cavity. The heating element is electrically connected to a power source for generating heat.

10 Claims, 5 Drawing Sheets

WARMER WITH INTEGRATED HEATING MODULE

BACKGROUND OF THE PRESENT INVENTION

Field of Invention

The present invention relates to a warmer, and more particularly to a warmer comprising an integrated heating module in which a conductive member, a heating element and an insulating member are assembled to form an integrated structure.

Description of Related Arts

A conventional warmer usually comprises a main housing, a heating plate secured on top of the main housing, and a heating element supported in the main housing for generating heat. The heating element is thermally communicated with the heating plate and is electrically connected to an external power source, usually through a control circuitry. When the conventional warmer is electrically connected to an external power source, such as an AC power source, the heating element is arranged to generate heat to heat up the heating plate. The heating plate may then be used to heat up a cooking container placed thereon.

A major disadvantage of conventional warmers such as the one described above is that the heating element must be individually assembled in the main housing along with other components of the warmer. For example, some sorts of insulating layers may be provided in the main housing to prevent excessive heat from damaging other components of the warmer. These other components and the heating element must be individually assembled and mounted in the main housing. This practice makes the manufacturing procedures complicated. Moreover, when any one of these components is not properly mounted in the main housing, disorders may happen in the resulting warmer. For instances, if an insulating layer is not properly mounted with respect to the heating element, other components may be damaged by excessive heat.

As a result, there is a need to develop a warmer which may improve upon the above-mentioned conventional warmers and resolve the above-mentioned problems in relation to conventional warmers.

SUMMARY OF THE PRESENT INVENTION

Certain variations of the present invention provide a warmer comprising an integrated heating module in which a conductive member, a heating element and an insulating member are assembled to form an integrated structure.

Certain variations of the present invention provide a warmer comprising an integrated heating module, wherein the relative position of the heating element may be fixed with respect to the conductive element and the insulating member in the integrated structure so as to ensure that each of the components of the warmer will work properly.

Certain variations of the present invention provide a warmer comprising an integrated heating module, wherein a manufacturing process of the warmer may be substantially simplified.

In one aspect of the present invention, it provides a warmer, comprising:

a main housing having a receiving cavity;

a heating assembly, which comprises:

a top heating plate secure on a top surface of the main housing; and an integrated heating module which comprises a heating element and an insulating member assembled to form an integrated structure, the insulating member being provided on a bottom side of the heating element for preventing excessive heat from reaching the receiving cavity, the heating element being connected to a power source for generating heat; and a control module received in the receiving cavity, the control module comprising a PCB and a control circuitry implemented on the PCB, the PCB being electrically connected to the integrated heating module for controlling an operation thereof.

In another aspect of the present invention, it provides a warmer, being manufacturing by a manufacturing method which comprises the steps of:

(a) providing a main housing having a top housing member and a bottom housing member, and an internal supporting frame;

(b) connecting a conductive member, a heating element and an insulating member in a one-piece structure to form an integrated heating module, in such a manner that said heating element is sandwiched between said conductive member and said insulating member;

(c) connecting a base frame underneath said integrated heating module;

(d) mounting a top heating plate, said integrated heating module and said base frame on said top housing member and said internal supporting frame;

(e) mounting a PCB on said internal supporting frame, wherein said PCB has a control circuitry implemented thereon, said PCB being electrically connected to said integrated heating module;

(f) mounting a control panel on said main housing and said internal supporting frame, said control panel comprising a control button and a display, said control button and said display being exposed to an exterior of said main housing through at least one control slot formed thereon; and (g) connecting the bottom housing member to the top housing member.

Another aspect of the present invention provides a warmer, being manufacturing by a manufacturing method which comprises the steps of:

(a) providing a main housing having a top housing member and a bottom housing member, and an internal supporting frame;

(b) connecting a heating element and an insulating member in a one-piece structure to form an integrated heating module;

(c) connecting a base frame underneath the integrated heating module;

(d) connecting a conductive member on a bottom side of the top heating plate;

(e) mounting the top heating plate, the integrated heating module and the base frame on the top housing member and the internal supporting frame;

(f) mounting a PCB on the internal supporting frame, wherein the PCB has a control circuitry implemented thereon, the PCB being electrically connected to the integrated heating module;

(g) mounting a control panel on the main housing and the internal supporting frame, the control panel comprising a control button and a display, the control button and the display being exposed to an exterior of the main housing through at least one control slot formed thereon; and (h) connecting the bottom housing member to the top housing member.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
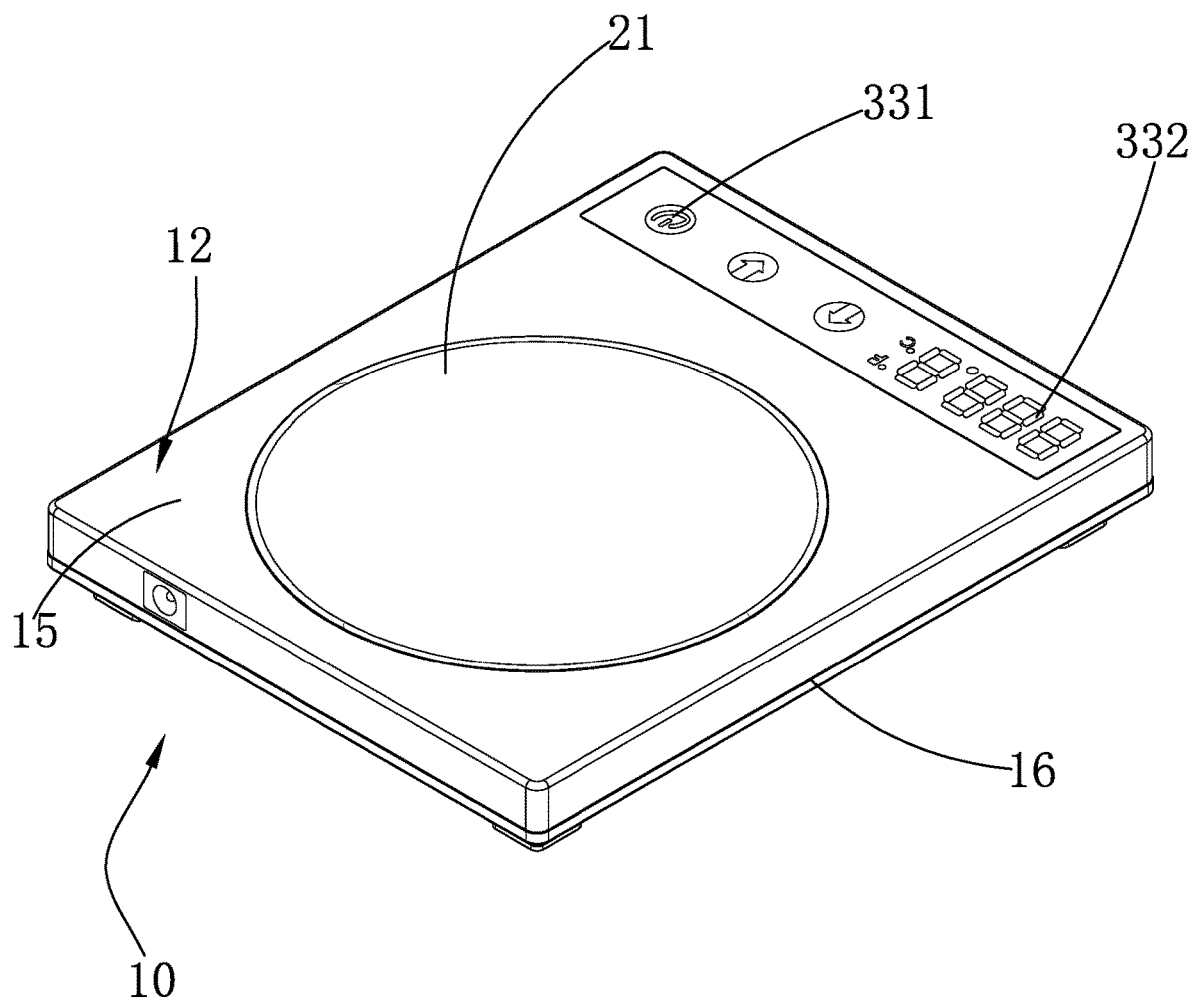
FIG. 1 is a perspective view of a warmer according to a preferred embodiment of the present invention.
Figure 2:
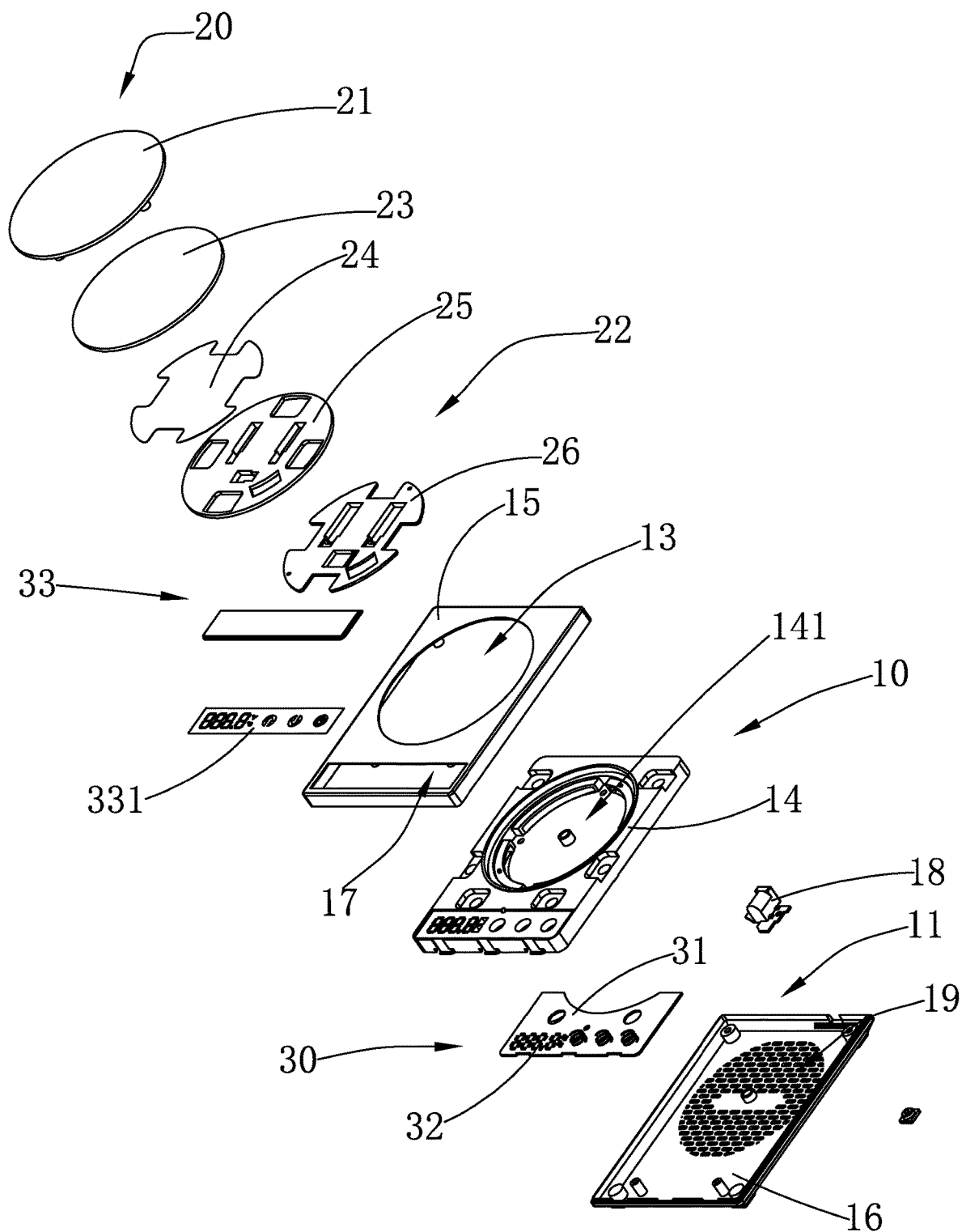
FIG. 2 is an exploded perspective view of the warmer according to the preferred embodiment of the present invention.
Figure 3:
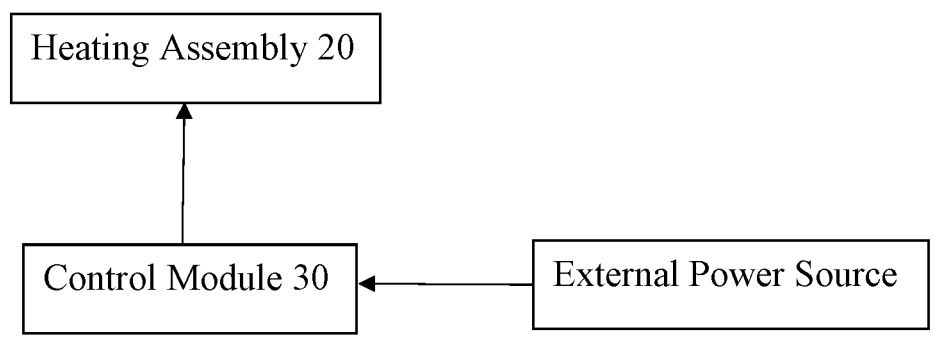
FIG. 3 is a schematic block diagram of the warmer according to the preferred embodiment of the present invention.

Referring to FIG. 1 to FIG. 3 of the drawings, a warmer according to a preferred embodiment of the present invention is illustrated. Broadly, the warmer may comprise a main housing 10 having a receiving cavity 11, a heating assembly 20, and a control module 30. The warmer may be utilized to deliver a predetermined amount of heat to a cooking container.

The heating assembly 20 may comprise a top heating plate 21 and an integrated heating module 22. The top heating plate 21 may be secured on a top surface 12 of the main housing 10.

The integrated heating module 22 may comprise a conductive member 23, a heating element 24, and an insulating member 25 assembled to form an integrated structure. The conductive member 23 may be provided on a top side of the heating element 24 for conducting heat to the top heating plate 21. The insulating member 25 may be provided on a bottom side of the heating element 24 for preventing excessive heat from reaching the receiving cavity 11. The heating element 24 may be connected to a power source for generating heat.

The control module 30 may be received in the receiving cavity 11, and comprise a Printed Circuit Board (PCB 31) and a control circuitry 32 implemented on the PCB 31. The PCB 31 may be electrically connected to the integrated heating module 22 for controlling an operation thereof.

According to the preferred embodiment of the present invention, the main housing 10 may be configured to have a rectangular cross-sectional shape when viewed from the top. Other cross-sectional shapes for the main housing 10 may also be possible. As shown in FIG. 1 and FIG. 2 of the drawings, the main housing 10 may be constituted by a top housing member 15 and a bottom housing member 16, and may have a central opening 13 formed on the top surface 12 of the top housing member 15 for fittedly accommodating the top heating plate 21 of the heating assembly 20. The central opening 13 may communicate the receiving cavity 11 with an exterior of the main housing 10. The receiving cavity 11 may be arranged to securely accommodate the heating assembly 20 and the control module 30.

The main housing 10 may further comprise an internal supporting frame 14 received in the receiving cavity 11. The internal supporting frame 14 may have an indented securing cavity 141 formed at a position aligning and corresponding to the central opening 13 of the top housing member 15. The integrated heating module 22 may be supported in the indented securing cavity 141. The internal supporting frame 14 may be detachably secured in the receiving cavity 11 for ease of maintenance and installations of various electrical and mechanical components. As shown in FIG. 2 of the drawings, many electrical and mechanical components of the warmer of the present invention may be mounted on the internal supporting frame 14 which may then be embedded by the top housing member 15 and the bottom housing member 16.

On the other hand, the top heating plate 21 may be securely mounted on the central opening 13 of the main housing 10. The top heating plate 21 may be connected to the integrated heating module 22 so that when the integrated heating module 22 is heated, the top heating plate 21 will also be heated up for heating the cooking container disposed thereon. The top heating plate 21 may be configured from composite material such as aluminum composite material, and may be coated with non-stick material, such as polytetrafluoroethylene (PTFE).

The heating element 24 may be sandwiched between the conductive member 23 and the insulating member 25. The conductive member 23, the heating element 24 and the insulating member 25 may form an integral structure which may be secured in the receiving cavity 11 of the main housing 10.

In this preferred embodiment, the conductive member 23 may be formed as part of the integrated heating module 22. In another variation of the present invention, the conductive member 23 may be attached on the top heating plate 21 as a thin layer for conducting heat from the integrated heating module 22 to the top heating plate 21. These variations are within the scope of the present invention. In the latter variation, the integrated heating module 22 only comprise the heating element 24 and the insulating member 25. The integral structure may be formed by adhesive technologies or other methods. The main point is to make the two or three layers of materials into a one-piece structure.

The integrated heating module 22 may be electrically connected to the PCB 31 of the control module 30 in such a manner that the PCB 31 and the control circuitry 32 may supply electrical power to the heating element 24 in a controlled manner. The heating element 24 may then generate a predetermined amount of heat to heat up the top heating plate 21 through the conductive member 23.

According to the preferred embodiment of the present invention, the heating element 24 may be configured from a composite material having at least one of polyethylene terephthalate (PET), polyimide (PI) material, Nanocarbon particles and Nano-silver particles, and may be configured as a panel-like structure. This panel-like structure may easily be sandwiched and mounted between the conductive member 23 and the insulating member 25. A size and shape of the heating element 24 may correspond to that of the conductive member 23, the insulating member 25, and the top heating plate 21. For example, where the top heating plate 21, the conductive member 23 and the insulating member 25 are all circular in cross-sectional shape when viewed from the top, the heating element 24 may be sized and shaped to have a substantially circular cross section. In this preferred embodiment, an overall cross-sectional area of the heating element 24 may not exceed the overall cross-sectional area of the conductive member 23 and the insulating member 25, because they should form an integrated structure. The overall cross-sectional area and size of the integrated heating module 22 may not exceed that of the top heating plate 21. These arrangements may keep the overall size and structure of the warmer compact and neat.

Similarly, the insulating member 25 may be configured as a panel or sheet-like structure and may be made from fiber glass, asbestos, wool material, silicate or other heat insulating materials or apparatuses. The insulating member 25 may be configured as a relatively softer or more flexible material.

The heating assembly 20 may further comprise a base frame 26 mounted underneath the integrated heating module 22 and may be connected to the internal supporting frame 14 for structurally reinforcing the insulating member 25 so as to prevent the insulating member 25 from accidentally dislocating in the receiving cavity 11. The base frame 26 may be made of or configured from rigid material such as metal.

The control module 30 may further comprise a control panel 33 mounted on the main casing 10 and electrically connected to the PCB 31 and the control circuitry 32. The control panel 33 may comprise at least one control button 331 and a display 332 for allowing a user to control and manage an operation of the warmer. The display 332 may be arranged to display an operation status of the warmer of the present invention.

The display 332 may be configured as a LCD or LED display which may or may not have touchscreen function. Thus, the control button 331 may be a mechanical button or a virtual button implemented on the display 332 when the display 332 is configured as a touchscreen display. The display 332 and/or the control button 331 may be mounted on the internal supporting frame 14 while the main housing 10 may have at least one control slot 17 formed on the top housing member 15. The display 332 and/or the control button 331 may be exposed to an exterior of the main housing 10 through the control slot 17. When the display 332 is configured as a touchscreen display, the display 332 may have a tempered glass cover. The tempered glass cover may be made of sodium silicate glass material or other materials.

The main housing 10 may further comprise a power port 18 electrically connected to the control module 30. The power port 18 may be configured as an electrical socket adapted for electrically connecting to an external power source, such as an AC power source, or a DC power source.

The main housing 10 may further comprise a plurality of ventilating holes 19 formed on the bottom housing member 16 for providing ventilation to and for dissipating heat from the receiving cavity 11.

It is worth mentioning that the mechanical connections described above may include conventional mechanical connection methods such as connections by screws, or through adhesives.

Figure 4:
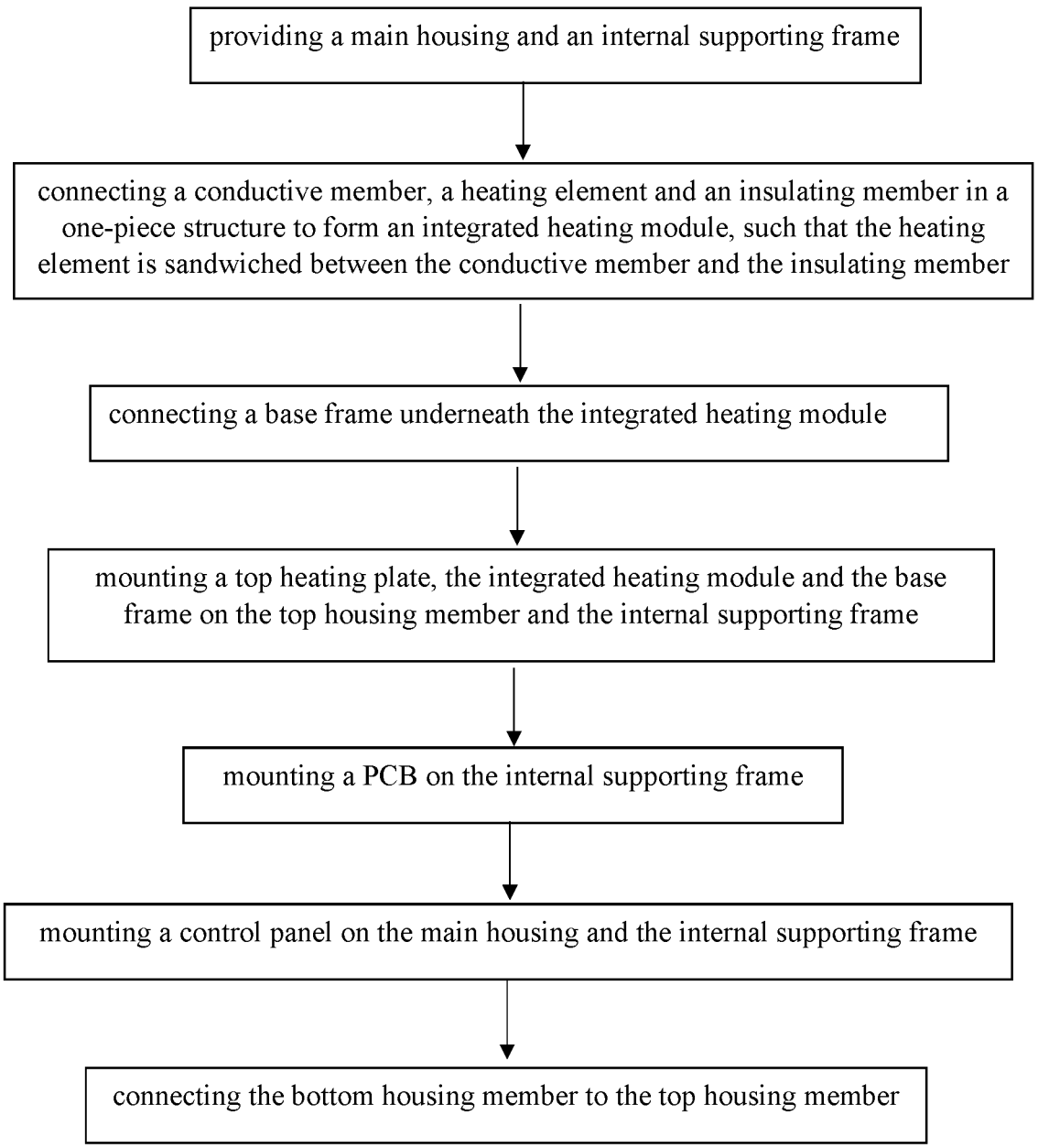
FIG. 4 is a block diagram of a method of manufacturing the warmer according to the preferred embodiment of the present invention.

Referring to FIG. 4 of the drawings, a method of manufacturing a warmer according to a preferred embodiment of the present invention is illustrated. The manufacturing method may comprise the steps of:

(a) providing a main housing 10 having a top housing member 15 and a bottom housing member 16, and an internal supporting frame 14;

(b) connecting a conductive member 23, a heating element 24 and an insulating member 25 in a one-piece structure to form an integrated heating module 20, in such a manner that the heating element 24 is sandwiched between the conductive member 23 and the insulating member 25;

(c) connecting a base frame 26 underneath the integrated heating module 20;

(d) mounting a top heating plate 21, the integrated heating module 20 and the base frame 26 on the top housing member 15 and the internal supporting frame 14;

(e) mounting a PCB 31 on the internal supporting frame 14, wherein the PCB 31 has a control circuitry 32 implemented thereon, the PCB being electrically connected to the integrated heating module 20;

(f) mounting a control panel 33 on the main housing 10 and the internal supporting frame 14, the control panel 33 comprising a control button 331 and a display 332, the control button 331 and the display 332 being exposed to an exterior of the main housing 10 through at least one control slot 17 formed thereon; and (g) connecting the bottom housing member 16 to the top housing member 15.

The warmer of the present invention as described above may be manufactured by the manufacturing process comprising the steps (a) through (g) above. As compared to conventional arts, the manufacturing process can be much simplified and the overall structural integrity of the warmer can be substantially enhanced.

Figure 5:
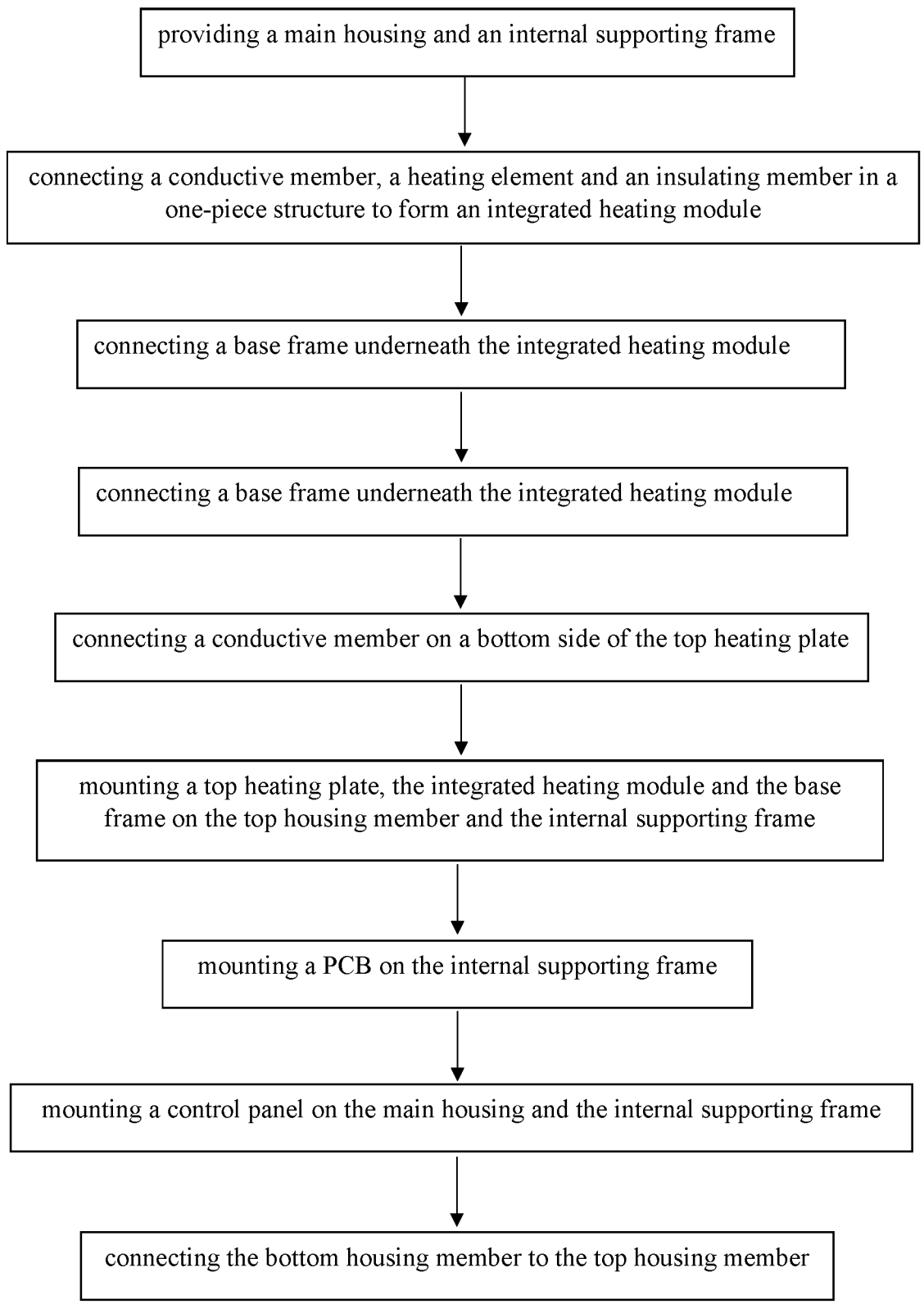
FIG. 5 is a block diagram of an alternative method of manufacturing the warmer according to the preferred embodiment of the present invention.

Referring to FIG. 5 of the drawings, an alternative method of manufacturing a warmer according to a preferred embodiment of the present invention is illustrated. The alternative manufacturing method may comprise the steps of:

(a) providing a main housing 10 having a top housing member 15 and a bottom housing member 16, and an internal supporting frame 14;

(b) connecting a heating element 24 and an insulating member 25 in a one-piece structure to form an integrated heating module 20;

(c) connecting a base frame 26 underneath the integrated heating module 20;

(d) connecting a conductive member 23 on a bottom side of the top heating plate 21;

(e) mounting the top heating plate 21, the integrated heating module 20 and the base frame 26 on the top housing member 15 and the internal supporting frame 14;

(f) mounting a PCB 31 on the internal supporting frame 14, wherein the PCB 31 has a control circuitry 32 implemented thereon, the PCB being electrically connected to the integrated heating module 20;

(g) mounting a control panel 33 on the main housing 10 and the internal supporting frame 14, the control panel 33 comprising a control button 331 and a display 332, the control button 331 and the display 332 being exposed to an exterior of the main housing 10 through at least one control slot 17 formed thereon; and (h) connecting the bottom housing member 16 to the top housing member 15.

This alternative method of manufacturing the warmer reflects the situation where the conductive member 23 is attached on the bottom side of the top heating plate 21, as described above.

The present invention, while illustrated and described in terms of a preferred embodiment and several alternatives, is not limited to the particular description contained in this specification. Additional alternative or equivalent components could also be used to practice the present invention.

What is claimed is:

1. A warmer, comprising:
a main housing having a receiving cavity;
a heating assembly, which comprises:

a top heating plate secured on a top surface of said main housing; and an integrated heating module which comprises a heating element, a thermally conductive member, and a thermally insulating member assembled to form an integrated structure and secured in said receiving cavity of said main housing, said thermally insulating member being provided on a bottom side of said heating element for preventing excessive heat from reaching said receiving cavity, said heating element being sandwiched between said thermally conductive member and said thermally insulating member as three integrated layers, said heating element being connected to a power source for generating heat; and a control module received in said receiving cavity, said control module comprising a PCB and a control circuitry implemented on said PCB, said PCB being electrically connected to said integrated heating module for controlling an operation thereof.

2. The warmer, as recited in claim 1, wherein said heating element is configured from a composite material consisting at least one of polyethylene terephthalate material, polyimide material, Nanocarbon particles, and Nano-silver particles.

3. The warmer, as recited in claim 1, wherein said main housing comprises a top housing member and a bottom housing member, and has a central opening formed on said top surface of said top housing member for fittedly accommodating said top heating plate of said heating assembly.

4. The warmer, as recited in claim 2, wherein said main housing comprises a top housing member and a bottom housing member, and has a central opening formed on said top surface of said top housing member for fittedly accommodating said top heating plate of said heating assembly.

5. The warmer, as recited in claim 3, wherein said main housing further comprises an internal supporting frame received in said receiving cavity, said internal supporting frame having an indented securing cavity formed at a position aligning and corresponding to said central opening of said top housing member, said integrated heating module being supported in said indented securing cavity.

6. The warmer, as recited in claim 4, wherein said main housing further comprises an internal supporting frame received in said receiving cavity, said internal supporting frame having an indented securing cavity formed at a position aligning and corresponding to said central opening of said top housing member, said integrated heating module being supported in said indented securing cavity.

7. The warmer, as recited in claim 5, wherein said heating assembly further comprises a base frame mounted underneath said integrated heating module and connected to said internal supporting frame for structurally reinforcing said thermally insulating member so as to prevent said thermally insulating member from accidentally dislocating in said receiving cavity.

8. The warmer, as recited in claim 6, wherein said heating assembly further comprises a base frame mounted underneath said integrated heating module and connected to said internal supporting frame for structurally reinforcing said thermally insulating member so as to prevent said thermally insulating member from accidentally dislocating in said receiving cavity.

9. The warmer, as recited in claim 7, wherein said control module further comprises a control panel mounted on said main casing and electrically connected to said PCB and said control circuitry, said control panel comprising at least one control button and a display for allowing a user to control and manage an operation of said warmer.

10. The warmer, as recited in claim 8, wherein said control module further comprises a control panel mounted on said main casing and electrically connected to said PCB and said control circuitry, said control panel comprising at least one control button and a display for allowing a user to control and manage an operation of said warmer.

* * * * *